L. E. ALLYN & G. T. TURNER.
F. M. TURNER, ADMINISTRATRIX OF G. T. TURNER, DEC'D.
TANK CAR.
APPLICATION FILED DEC. 16, 1908.

1,097,961.

Patented May 26, 1914.

2 SHEETS—SHEET 1.

WITNESSES:
C. L. Belcher
George W. Ramsey

INVENTORS
GEO. T. TURNER, DEC'D
FLORA MAY TURNER, ADM'R'X
and LOUIS E. ALLYN
BY T. H. Gibbs
ATTORNEY

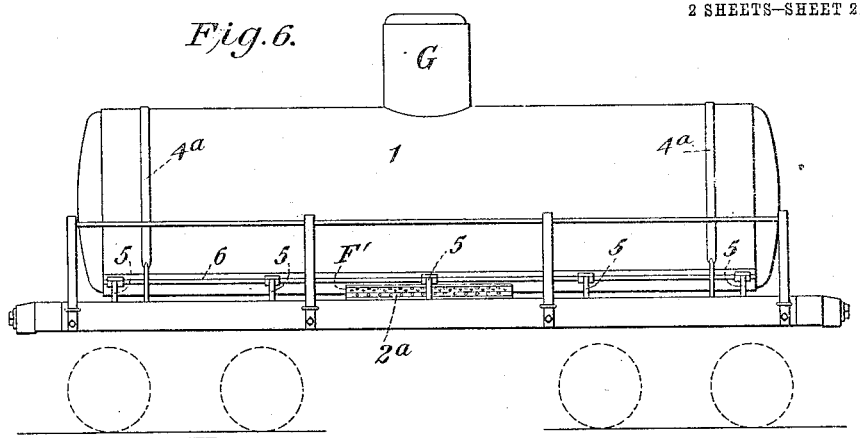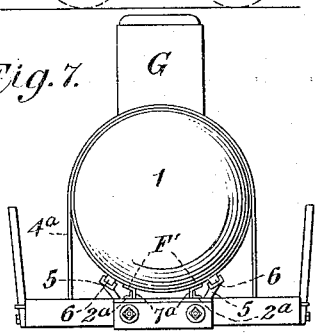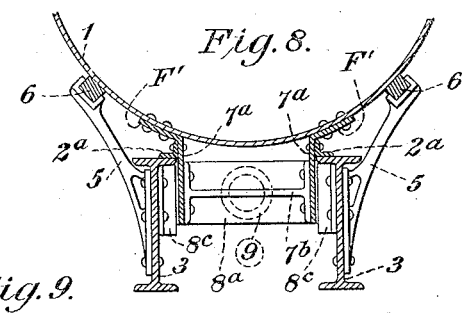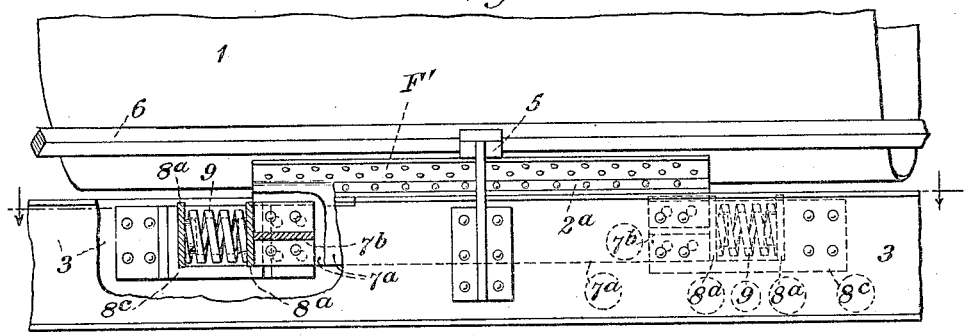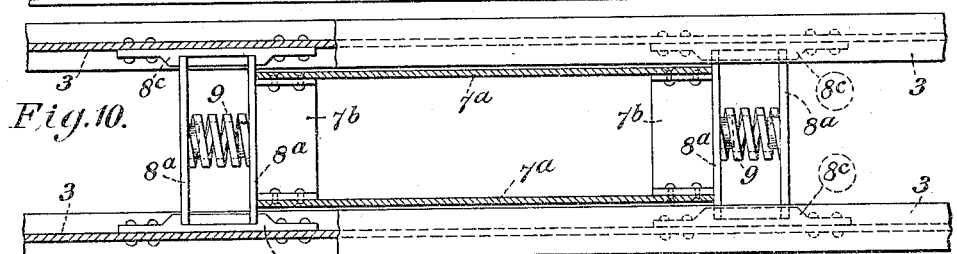

UNITED STATES PATENT OFFICE.

LOUIS E. ALLYN, OF PEKIN, AND FLORA MAY TURNER, OF COAL CITY, ILLINOIS, ADMINISTRATRIX OF GEORGE T. TURNER, DECEASED, ASSIGNORS, BY DIRECT AND MESNE ASSIGNMENTS, TO AMERICAN CAR AND FOUNDRY COMPANY, OF ST. LOUIS, MISSOURI, A CORPORATION OF NEW JERSEY.

TANK-CAR.

1,097,961. Specification of Letters Patent. Patented May 26, 1914.

Application filed December 16, 1908. Serial No. 467,824.

*To all whom it may concern:*

Be it known that we, LOUIS E. ALLYN, citizen of the United States, residing at Pekin, in the county of Tazewell and State of Illinois, and GEORGE T. TURNER, deceased, late a citizen of the United States and resident of Peoria, in the county of Peoria and State of Illinois, (FLORA MAY TURNER, of Coal City, county of Grundy, and State of Illinois, administratrix of said GEORGE T. TURNER,) have invented new and useful Improvements in Tank-Cars, of which the following is a specification.

Our invention relates to new and useful improvements in tank cars, and has particular reference to means for support in connection with car underframes to secure the tank on such underframes.

The invention also provides means to permit longitudinal shift, and for cushioning the tank with relation to its support to relieve the tank from wrenches, jars and strain attending its practical use.

That our invention may be more fully understood, reference is had to the accompanying drawings, in which—

Figure 1:
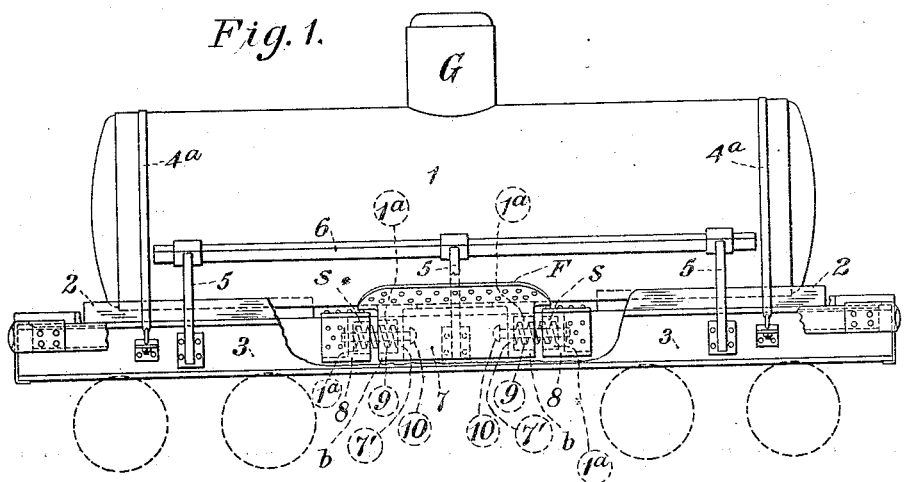
Figure 2:
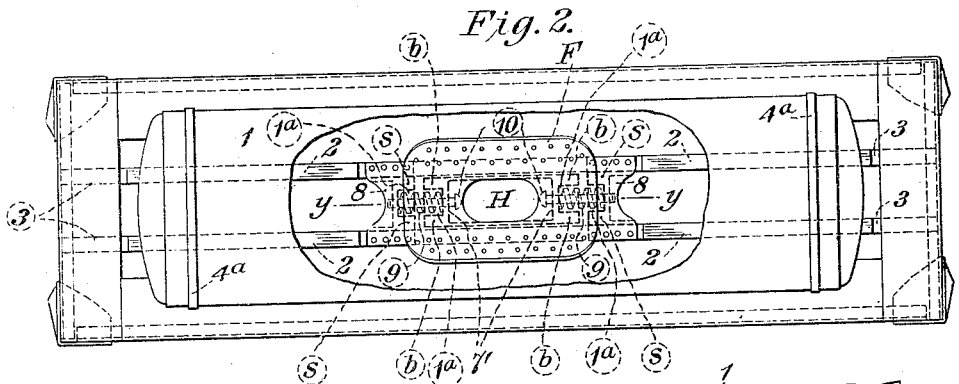
Figure 3:
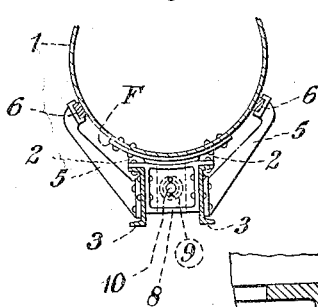
Figure 4:
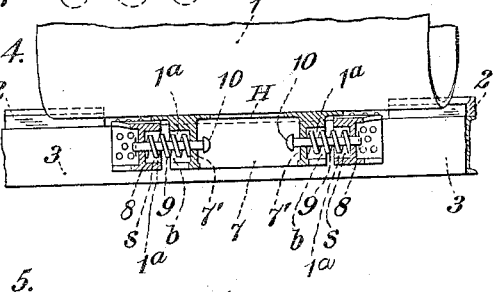
Figure 5:
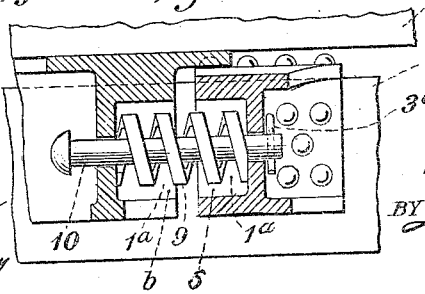

Figure 1 is a side elevation of our invention as applied, with certain portions broken away to more clearly illustrate detailed parts; Fig. 2 is a plan view, showing the application of the invention, a portion of the tank being broken away for the purpose of better illustrating detailed parts, Fig. 3 is a vertical sectional view showing the manner of mounting the tank upon a frame support. Fig. 4 is a partial sectional view through the line *y—y* of Fig. 2. Fig. 5 is an enlarged detail fragmentary view showing the connection of tank and underframe. Figs. 6, 7, 8, 9 and 10 are views of the invention slightly modified in details of construction, and illustrate respectively a side elevation; an end elevation; a transverse fragmentary sectional view taken on line 8—8 of Fig. 6; an enlarged fragmentary side elevation partly in section and a similarly enlarged sectional view taken on the line 10—10 of Fig. 9.

Tanks such as are used on railroad cars are constructed of steel plates riveted together and it has been customary to secure the tank rigidly to the car frame either by direct rivet connection of the tank to some part of the understructure or to position the tank between head blocks secured to the car underframe at each end of the tank and tie the tank in position by means of tank straps partly encircling the tank and secured to said understructure. With the rigid mounting, however, the continued jarring of the car wrenches and strains the tank, particularly those portions that are joined to the car frame and the ends of the tank which contact with said head blocks and has the effect to soon loosen the joints and seams so that the tank is caused to leak. This is not only a decided disadvantage because of the necessity of constantly repairing the loosened seams but the leakage is very dangerous when the tanks contain oil, as is apparent.

To obviate the disadvantage of rigidly mounting the tank, the parts upon the tank are formed to be seated in parts upon the truck and without any rigid connection between the tank and the truck so that the tank may be readily lifted from the truck. Also, the interengaging parts between the tank and the truck are so formed that there is lateral engagement between such parts to prevent any turning of the tank upon the truck, thus dispensing with the customary dome yoke and straps connecting it to the underframe. The seat on the truck is made longer than the interengaging part upon the tank to permit longitudinal movement of the latter within certain limits. A stop against longitudinal movement is of course essential and is provided, and we have also interposed a resilient part between the stop and the interengaging part upon the tank to form a cushion to prevent excessive jar. The stop against longitudinal movement comprises an anchor member connected with the shell of the tank in such manner as to permit free expansion of the tank. As cars are subjected to enormous stresses in service due principally to buffing shocks it is essential that the tank and anchor therefor shall be rigidly connected. Because the anchor is intended to receive such shocks, it is desirable that it shall be of great strength.

It is essential that the connection of the tank and tank anchor shall be distributed over a considerable area so as to prevent tilting of the anchor and buckling the sheets of the tank in contact therewith under buffing stresses. To that end the anchor is provided with a plate or flanged portion F of relatively large area as shown extending under a portion of the tank and directly secured thereto by rivet connection. As the anchor preferably depends from this plate below the plane of the top of the sills of the car, to prevent rocking of the tank, it is desirable to so form said anchor that it will rest in near proximity to the sills and preferably between such sills and to make its depending portion sufficiently stiff to resist lateral thrust, hence the depending longitudinal wall portions 7 of the cast anchor which rest in relative proximity to the center sills 3 of the car are connected to form a brace therebetween. The connection between the spaced walls of the anchor is also useful in our invention because it provides a cross connection of such walls which is adapted to instantly distribute stresses to produce coöperation of said walls in buffing.

To insure proper and expeditious application of the several parts comprising the means for anchoring the tank on its underframe we prefer to form the anchor and the anchor stops or abutments of cast metal of the general form indicated in Figs. 1, 2 and 3 of the drawings in which figures it will be noted that the anchor comprises a unitary casting having a relatively wide and long perforated plate or flange portion, F, which spans the space between the center sills, overlapping said sills at the sides.

The perforation, H, shown in Fig. 2, is disposed in vertical alinement with the dome G of the tank, as is usual in tank cars, in which a discharge valve is commonly applied at the middle of the tank so that valve release mechanism may be manipulated from the dome when a dome cap is removed. A discharge valve and its appurtenances are old in the art and are not illustrated.

Referring particularly now to the drawings Figs. 1 to 5 inclusive, the tank 1 is shown supported upon wooden bars 2—2—2—2, which in turn are supported upon the beams or center sills 3—3 which extend more than the full length of the tank and are suitably supported in connection with the car frame on suitable trucks. Lateral support is provided for the tank by means of the brackets 5—5—5 as shown in Fig. 1, a similar set of brackets being provided on the opposite side. These brackets are properly secured to the beams or sills as shown, the upper ends of the said brackets carrying bars as 6 secured therein, there being one provided on each side of the tank, and each having a bearing against the same. The wood bearing surfaces 2 and 6 are provided to furnish a bearing adapted to assist in positioning the tank upon which the metal tank will quite readily slide but of course any other materials may be used that may be found suited to the purpose and to best facilitate the object sought. Depending from the central portion of the tank and properly secured thereto is the anchor before referred to comprising the flanged portion F; side plates 7 and perforated end walls 7' and adjacent the respective ends thereof are provided the lugs or abutment stops 8—8 interposed between and secured to the sills 3—3, the respective stops of the tank and the sill supports being properly spaced a short distance apart to provide some latitude of movement of the tank upon the support. Interposed between the anchor on the tank and the stops 8 on the sills, we have provided spring cushion arrangements, comprising springs as 9—9, one or more on each end of the tank anchor and interposed between the wall of the same and the stops 8—8. The opposing faces of the anchor and its abutment are recessed or set in a short distance as shown in Figs. 1, 2 and 3 thereby providing sockets to receive the ends of the springs 9—9. 10—10 are bolts carried through perforations in the respective end walls of the anchor and likewise through perforations in the walls of stops 8—8 and fastened therein by means of cotter pins 3ª or any suitable means, the pins being made of sufficient length to permit a certain limited longitudinal movement between the stops 7 and 8. It is of course obvious that movement of the tank will be limited to the distance between the stops and under almost any working conditions, the jar or forward thrust of the tank attendant upon the bumping of cars together will be stopped by the springs, thereby relieving the tank from excessive jars and strains.

The stops or abutments 8 on the sills span the space between the sills and when connected directly thereto as best shown in Fig. 1, serve not only as stops for the tank anchor but also as means for connecting the sills fore and aft, the tank anchor thereby preventing outward deflection or spreading of said sills under buffing stresses. Thus the relatively rectangular box like depending portion of the tank anchor is held within a correspondingly shaped seat which, though formed of separate members acts as a unit in holding the tank anchor against excessive movement in either a lateral or longitudinal direction. It would be practically impossible to seat the anchor between the sills and between the stops or abutments unless the depending portion of the tank anchor is of less sectional area transversely than the space it is to occupy, hence the depending portion of said anchor is made shorter than the longitudinal distance between said stops and slightly narrower than the distance between the center sills of the car. As an excessive movement of the tank is undesirable there are interposed between the walls 7' of the anchor and its abutments, certain supplementary stops *b b* on opposite ends of the anchor casting and coöperating alined stops *s* on said abutments. The distance between these stops is less than the distance between the vertical walls of the anchor and the contiguous walls of the abutments and accommodate the relatively large springs 9. The said contiguous walls and said stops form sockets or spring seats 1$^a$ through which sockets are projected said pins 10 carrying the cushioning springs. Longitudinal movement of the tank on its underframe is resisted by the spring. If for any reason the spring should fail, or be sufficiently compressed, such movement is limited owing to the stops *s* and it is evident that if the springs are not used the movement of the tank will be slight. The tank is designed for railway service and is to be provided with such standard equipment as is required to conform to recommended practice of The Master Car-Builders' Association published in 1904, such as tank straps 4$^a$, draft gear, and trucks (not shown).

The modification illustrated in Figs. 6 to 10 inclusive shows the construction represented in the caveat filed by us in 1905, 1906 and 1907, and differs from the construction of the other figures principally in being built up, that is made of separately formed elements properly connected by suitable rivets. Where suitable castings are not obtainable this structure may be employed though it is evident that unitary castings are preferable. The construction of Figs. 6 to 10 inclusive corresponds in most of its details with the construction of the other views and comprises the tank 1, sills 3, with wear strips 2$^a$, the brackets 5, wood bars 6 and a tank anchor formed of the plates 7$^a$ flanged at F' and having the cross connection 7$^b$ of I-section thereby providing a vertical face adapted to abut means carried by the center sills. The means carried by the center sills form stops for the tank anchor and are formed of the parallel plates 8$^a$ and interposed springs 9, said plates being positioned and movable in the castings 8$^c$ which are riveted to the inner faces of the spaced center sills 3 so as to work as a unit in resisting end thrust of the tank on its underframe. Because of the absence of the bolt or pin 10 in the modified construction there is nothing to prevent removal of the tank vertically except the tank straps 4$^a$ which may be disconnected if desired. In place of the wood strips 2 of Fig. 1, this modification shows the angles 2$^a$ which are riveted to the plates 7$^a$ and rest on the top surface of the center sills though the strips 2 and the angles 2$^a$ perform the same function; viz. to position the tank on its understructure and prevent wear of the tank incident to longitudinal shifting thereof.

What we claim is:

1. In a tank car, the combination with a railway truck and with a tank adapted to be supported thereon, of a seat suitably supported upon the truck and a depending portion upon the tank adapted to bear within the seat upon the truck rendering the tank readily detachable from the truck and preventing rocking movement of the tank upon the truck.

2. In a tank car, the combination with a truck of a tank detachable therefrom, interengaging parts located at substantially the longitudinal center of the car with one of said parts upon the truck and the other depending from the tank, whereby when the tank is placed upon the truck, the parts will engage to form a stop against lateral movement of the tank upon the truck and to limit longitudinal movement thereof.

3. In a tank car, the combination with a tank, of a frame, and interlocking members forming abutments between the tank and frame, which members are designed at all times to receive end thrusts and allow the tank to expand substantially throughout its length, substantially as described.

4. In a tank, the combination with an underframe, of a tank mounted on said underframe, and interlocking members forming abutments between the tank and frame, which members are designed at all times to receive end thrusts and allow the tank to expand substantially throughout its length; substantially as described.

5. In a tank car, the combination with a tank, of an underframe, lugs secured to the underframe near the center of the car, and a projection carried by the tank arranged between said lugs; substantially as described.

6. In a tank car, the combination of a tank, an underframe, and interlocking members on said tank and underframe, said members being located at the center of the car and having coincident engaging faces; substantially as described.

7. In a tank car, the combination with a tank, of an underframe, and interlocking members between said tank and underframe, one of which interlocking members is secured to the underframe near the center thereof, substantially as described.

8. In a tank car, an underframe, a tank, a hollow projection carried by said tank at substantially the longitudinal mid portion thereof, flanges on said projection secured to said tank, and lugs on said underframe adapted to coöperate with said projection to hold the tank in position.

9. In a tank car, an underframe, a tank, a hollow projection carried by said tank, curved flanges on said projection secured to said tank, and lugs on said underframe adapted to coöperate with said projection.

10. In a tank car, an underframe, a tank, a flanged casting secured to the lower portion of said tank and a lug secured to the underframe at each side of said casting.

11. In a tank car, an underframe comprising center sills, a tank, a casting with lateral flanges secured to the lower portion of said tank near the middle portion thereof and extending transversely of said center sills and abutments secured to the underframe at each side of said casting.

12. In a tank car, an underframe including center sills, a tank, a depending casting secured to the lower middle portion of said tank and extending transversely of said center sills and an abutment secured to the underframe at each side of said casting, said tank being free to expand at each side of said abutments.

13. In a tank car, the combination with a tank, of a frame, interlocking members at the center of the car and resilient members interposed between the interlocking members for the purpose of reducing the jar.

14. In a tank car, the combination with an underframe, of a tank mounted on the underframe, interlocking members at the center of the car, springs interposed between the interlocking members, to reduce the jar.

15. In a tank-car, the combination with a tank, of a frame, interlocking lugs secured to said tank and frame at their respective longitudinal middle portions and springs interposed between the lugs to take up the jar.

16. In a tank car, the combination with a tank, of an underframe, lugs secured to the underframe near the center of the car, a projection carried by the tank arranged between said lugs, springs interposed between said lugs and the projection carried by the tank to take up the jar.

17. In a tank car, the combination of a tank, an underframe, interlocking members on said tank and underframe at their respective longitudinal middle portions, resilient members interposed between the interlocking members of said tank and underframe, and means for supporting said members in proper position to reduce the jar attendant upon the shifting of the tank upon the underframe.

18. In a tank car, an underframe, a tank, a hollow projection carried by said tank, flanges on said projection secured to said tank, lugs on said underframe adapted to coöperate with said projection, springs interposed between said projection on the tank and the lugs on the underframe and means for holding the springs in position to reduce the jar attendant upon the shifting of the tank upon the underframe.

19. In a tank car, an underframe including a pair of longitudinally extending sills, a tank, a projection secured to said tank and depending therefrom, and lugs on said sills adapted to engage said projection on the tank to limit the longitudinal shifting of the tank.

20. In a tank car, an underframe including a pair of longitudinally extending sills, a tank, a projection secured to said tank and depending therefrom, and lugs on said sills adapted to engage said projection, springs interposed between said projection from the tank and the lugs on the sills to reduce the jar attendant upon the shifting of the tank upon the sills.

21. The combination with a car body, of a tank slidably supported thereon, a post projecting downwardly from the tank and carried thereby, and spring mechanism carried by the under middle portion of the car body and adapted for engagement with said post, thereby to relieve the tank of destructive action of violent thrusts.

22. The combination with one element in the form of a car body, of a second element in the form of a tank slidably supported upon the car body, spring mechanism carried by one of said elements and located beneath the tank at substantially the mid portion thereof, and a projecting structure carried by the other element and also located beneath the tank and having engagement with the spring mechanism, thereby to relieve the tank of destructive action of violent thrusts.

23. A device of the character described comprising a tank engaging plate, truck attaching members associated with said plate, and said plate and truck attaching members provided with interlocking means for preventing the disassembling of the parts when in an operative position, said interlocking means having a degree of play.

24. A device of the character described comprising a tank engaging member, socket members, and said socket members and tank engaging member provided with interlocking means whereby disassembling of the parts is prevented when the same are in their normal position on a car, said interlocking means having a degree of play.

25. In a tank car, the combination with a tank, of spaced center sills and interacting members normally positioned between the sills and forming abutments between the tank and the sills which members are also designed to at all times receive end thrusts and allow the tank to expand substantially throughout its length, and cushioning means for said interacting members.

26. A device for limiting the movement of the tank of a tank car comprising, in combination with an underframe and a tank readily removable therefrom, an anchor secured to the tank and a socketed member in alinement with said anchor at each end thereof.

27. A device of the character described, comprising an anchor member carried by a tank and provided with end extensions, and a pair of socket members carried by a car with which said extensions are adapted to engage.

28. A device of the character described, comprising an anchor member carried by and conforming to the contour of the bottom of a tank, and a pair of socket members connected with the sills of a car adapted to coöperate with said anchor member.

29. A device of the character described, comprising a concaved anchor member having outstanding extensions, and a pair of socket members with which said extensions are adapted to coöperate.

30. A device of the character described, comprising a concaved anchor member carried by a tank, outstanding extensions projecting from the ends of said member, and a pair of socket members in engagement with the sills of a car in alinement with said anchor member.

31. In a device of the character described, the combination with longitudinal sills, of a pair of stops connected with and between said sills, and an anchor carried by a tank adapted to engage said stops.

32. In a device of the character described, the combination with a longitudinal sills of a car, of a pair of spaced abutments extending between said sills and secured thereto and provided with flanges which overhang said sills, and an intermediate coöperating anchor member carried by a tank.

33. In a tank car, spaced center sills, a casting connected directly to each center sill thereby connecting the sills, and a coöperating casting spanning said sills and connected to a tank adapted to contact with said first mentioned casting.

34. In a tank car, spaced center sills, a tank anchor comprising an arcuate plate of relatively large area with a central orifice therein, and a depending portion substantially surrounding said orifice, said depending portion projecting into the plane of said sills.

35. In a device of the character described, an abutment for a tank anchor comprising a flanged casting overlapping and being secured between a pair of spaced center sills.

36. In a device of the character described, a tank, spaced sills, and a tank anchor spanning said sills and depending from the tank between the sills, said anchor being so formed that there is lateral engagement of the anchor to prevent turning of the tank upon the sills.

37. In a device of the character described, a center sill, a removable tank, and means spanning the sill and depending from the tank adapted to contact with the sill to prevent turning of the tank.

38. A tank car comprising center sills, a removable tank, and a tank anchor affixed to said tank, said anchor spanning the sills and adapted to be secured in position between said sills.

39. A tank car comprising center sills, a removable tank, tank anchor castings secured to said sills, and a tank anchor depending from said tank between said castings.

40. A tank car comprising center sills, a casting overlapping and secured to and connecting said sills, said casting being adapted to contact with anchoring means depending from a tank and extending longitudially thereof.

41. In a tank car, spaced center sills, a tank, an anchor having an arcuate upper portion adapted to conform to the curvature of the tank, and coöperating means connecting said spaced sills.

42. As an article of manufacture, a tank anchor adapted to be connected to a tank of a car tank and comprising an arcuate top portion of sufficient area to span the space between the center sills of a car, and having an extension depending therefrom to coöperate with means carried by said sills.

43. In a device of the character described, a tank, spaced sills, means connecting said sills, a tank anchor having an arcuate top portion spanning the space between said sills and a depending portion extending into the plane of said sills.

44. As an article of manufacture, a saddle-shaped tank anchor casting adapted to fit a tank, said casting comprising a depending perforated portion adapted to coöperate with stops carried by sills of a car underframe.

45. As an article of manufacture, an anchor casting for the tank of a tank car, adapted to extend between sills of a car, and comprising an arcuate top portion of relatively large area adapted to span said sills and provided with a depending portion of less width than the distance between said sills.

46. In a tank car, spaced center sills, a tank removably held in operative position on said sills, and separable coöperating tank anchoring means directly riveted respectively to said tank and to said sills at substantially longitudinal middle portions.

47. In a tank car, spaced center sills, a tank removably held in position on said sills, and coöperating means riveted respectively to said tank and to said sills, the means riveted to the tank spanning the sills and having a portion extending between said sills thereby preventing rocking of the tank.

48. In a tank car, spaced center sills, a tank removably mounted above said sills, an anchor casting spanning said sills and connected to said tank and depending therefrom between said sills, and means connected with the sills adapted to engage said casting.

49. In a tank car, the combination of a removable tank and center sills, means depending from the tank and extending longitudinally thereof between said center sills, and transversely extending means adapted to contact therewith for preventing longitudinal shifting of said tank beyond predetermined limits.

50. In a tank car, spaced center sills, a tank, and a tank anchor having an arcuate upper portion spanning the sills and secured to the tank and having a rigid lower portion depending below the top plane of the sills adapted to contact with said sills.

51. In a tank car, spaced center sills, a tank mounted above said sills, a member depending between and secured to and connecting said spaced sills, and a cushioning member interposed between the said first mentioned member and the tank.

52. In a tank car, spaced center sills, a casting provided with flanges secured by direct rivet connection to said sills thereby connecting them, a tank and a member between said tank and said casting and adapted to transmit end thrust of the tank to said casting.

53. In a tank car, an understructure and a tank mounted thereon in combination with a transversely rigid anchor projection on said tank extending in alinement with a vertical diameter of the tank, and a plurality of holding means secured in the understructure and passing through said projection.

54. In a tank car, an understructure including center sills, a tank mounted thereon and having a single transversely rigid projection coöperating with said center sills, and a key passing through said projection below the plane of the upper surface of said understructure and secured to said understructure.

55. In a tank car, an underframe comprising a pair of center sills, a tank on the underframe and having a single projection extending between and coöperating with said center sills to prevent rotation of the tank, and means for securing the tank independently of other securing means on the underframe.

56. In a tank car, an underframe, comprising a pair of center sills, castings secured to said sills, a tank having a portion extending between said castings and between said sills, and means projected through the extended portion of said tank and said castings.

57. In a tank car, a pair of sills, a tank, a depending perforated member attached to said tank and overlapping said sills, a coöperating perforated member attached to said sills and removable means projected through both perforated members.

58. In a tank car, an understructure, a tank so supported on said understructure as to permit expansion or contraction of the metal of the tank, a member depending from the tank and in alinement with a vertical diameter of the tank, and removable holding means projected through said depending member and the understructure.

59. In a car, an understructure, a tank resting upon said understructure, an anchor carried by the tank lapping the understructure, a member coöperating with the anchor, and removable holding means below the upper surface of said understructure.

60. In a car, an understructure, a car body resting upon said understructure, a depending perforated anchor device attached to said car body depending between and lapping a plurality of the longitudinal members of said understructure, a perforated casting secured to the understructure, and removable means projected through said anchor and said casting.

In testimony whereof, we have affixed our signatures, each in presence of two witnesses.

LOUIS E. ALLYN.
FLORA MAY TURNER,
*Administratrix of estate of George T. Turner, deceased.*

Witnesses to the signature of Louis E. Allyn:
EMIL G. ROSENTHAL,
MARY E. COMEGYS.

Witnesses to signature of Flora May Turner, administratrix of estate of Geo. T. Turner, deceased:
HENMAN B. SMITH,
ANDREW McKEAN.